US 11,777,438 B2

(12) United States Patent
Mizukami et al.

(10) Patent No.: US 11,777,438 B2
(45) Date of Patent: Oct. 3, 2023

(54) MOTOR DRIVE DEVICE

(71) Applicant: NIDEC SERVO CORPORATION, Kiryu (JP)

(72) Inventors: Koji Mizukami, Kiryu (JP); Junya Kaneko, Kiryu (JP); Katsuaki Kimura, Kiryu (JP)

(73) Assignee: NIDEC SERVO CORPORATION, Gunma (JP)

( * ) Notice: Subject to any disclaimer, the term of this patent is extended or adjusted under 35 U.S.C. 154(b) by 0 days.

(21) Appl. No.: 17/800,961

(22) PCT Filed: Feb. 10, 2021

(86) PCT No.: PCT/JP2021/005089
§ 371 (c)(1),
(2) Date: Aug. 19, 2022

(87) PCT Pub. No.: WO2021/172029
PCT Pub. Date: Sep. 2, 2021

(65) Prior Publication Data
US 2023/0073943 A1 Mar. 9, 2023

(30) Foreign Application Priority Data
Feb. 27, 2020 (JP) .................. 2020-031263

(51) Int. Cl.
*H02P 6/26* (2016.01)
*H02P 27/08* (2006.01)
(Continued)

(52) U.S. Cl.
CPC .......... *H02P 29/027* (2013.01); *H02M 7/537* (2013.01); *H02P 6/26* (2016.02); *H02P 27/08* (2013.01)

(58) Field of Classification Search
CPC .......... H02P 27/08; H02P 6/26; H02P 29/027; H02P 7/29; H02P 7/04; H02M 7/537; H02M 7/5387; H02M 1/32; H02M 1/0009
See application file for complete search history.

(56) References Cited

U.S. PATENT DOCUMENTS 4,314,191 A * 2/1982 Kawada ............ H02M 7/53875
318/807
5,675,231 A * 10/1997 Becerra ................... H02P 29/40
318/400.4
(Continued)

FOREIGN PATENT DOCUMENTS

JP 2010-268546 A 11/2010
JP 2013-247693 A 12/2013
(Continued)

*Primary Examiner* — Thai T Dinh
(74) *Attorney, Agent, or Firm* — KEATING & BENNETT

(57) ABSTRACT

A motor drive device includes a first drive circuit to control an energization period of a first upper arm switch and a first lower arm switch connected to one end of a coil, a second drive circuit to control an energization period of a second upper arm switch and a second lower arm switch connected to another end of the coil, a current detection circuit to detect current flowing through the coil and output a current detection signal indicating a detection result of the current, a first protection circuit to determine whether overcurrent has occurred based on the current detection signal and output a first enable signal indicating a determination result to the first drive circuit, and a second protection circuit to determine whether overcurrent has occurred based on the current detection signal and output a second enable signal indicating a determination result to the second drive circuit.

6 Claims, 5 Drawing Sheets

(51) Int. Cl.
*H02M 7/537* (2006.01)
*H02P 29/024* (2016.01)

(56) References Cited

U.S. PATENT DOCUMENTS

| | | | |
|---|---|---|---|
| 6,597,135 B2 * | 7/2003 | Smith | ........................ H02P 7/29 |
| | | | 318/400.26 |
| 9,130,493 B2 * | 9/2015 | Chen | .......................... H02P 6/26 |
| 10,972,038 B2 * | 4/2021 | Yu | ............................ H02P 25/04 |

FOREIGN PATENT DOCUMENTS

| | | | |
|---|---|---|---|
| JP | 2017-055499 A | 3/2017 | |
| JP | 2019-110684 A | 7/2019 | |

* cited by examiner

MOTOR DRIVE DEVICE

CROSS REFERENCE TO RELATED APPLICATION

This is a U.S. national stage of application No. PCT/JP2021/005089, filed on Feb. 10, 2021, and with priority under 35 U.S.C. § 119 (a) and 35 U.S.C. § 365(b) being claimed from Japanese Patent Application No. 2020-031263, filed on Feb. 27, 2020, the entire disclosures of which are hereby incorporated herein by reference.

1. FIELD OF THE DISCLOSURE

The present disclosure relates to a motor drive device.

2. BACKGROUND

In recent years, a single-phase direct-current motor is often used as a motor in order to downsize an apparatus equipped with a motor. In order to prevent heat generation and ignition from the single-phase direct-current motor, a motor drive device that drives the single-phase direct-current motor is required to have high safety. Therefore, the motor drive device is provided with a protection function for cutting off energization to the single-phase direct-current motor when an overcurrent occurs in the single-phase direct-current motor.

In particular, according to the VDE standard, which is a safety standard in Germany, it is required to enhance redundancy of the protection function by duplicating the protection function provided in the motor drive device. There is known a power converter for motor drive having a duplicated protection function.

The generally disclosed power converter for motor drive includes an inverter device, two gate drive circuits, PWM signal generation means, and safety stop means. When any one of two independent stop commands is input externally, the safety stop means fixes to turn off the output of at least one of the two gate drive circuits. For example, there is known a power converter for motor drive.

In the VDE standard, it is required to duplicate (make redundant) the protection function of a motor, but if this request is handled by software-based processing using a microcomputer or the like, it is necessary to perform software program evaluation with high cost and a long evaluation period. In the conventional technique, since a microcomputer or the like is required to generate two stop commands, it is necessary to perform soft program evaluation as evaluation as to whether the VDE standard is satisfied. Therefore, the conventional technique requires a long time and a high cost to evaluate the duplicated protection function.

In order to solve the above problem, it is conceivable to generate two stop commands by a protection circuit that is hardware, but it is necessary to design a drive circuit, a protection circuit, a wiring pattern, and the like so that redundancy of a protection function required by the VDE standard is not impaired.

SUMMARY

Example embodiments of the present disclosure provide motor drive devices capable of satisfying the following two requirements:

(1) It is possible to evaluate, at low cost and in a short period of time, whether the VDE standard is satisfied; and (2) It is possible to avoid loss of redundancy of the protection function required by the VDE standard.

A motor drive device according to an example embodiment of the present disclosure drives a single-phase direct-current motor, and includes a first drive circuit, a second drive circuit, a current detection circuit, a first protection circuit, and a second protection circuit. The first drive circuit includes a first upper arm switch that electrically connects one end of a coil of the single-phase direct-current motor and a power source, a first lower arm switch that electrically connects one end of the coil and GND, and a circuit that controls an energization period of the first upper arm switch and the first lower arm switch. The second drive circuit includes a second upper arm switch that electrically connects the other end of the coil and the power source, a second lower arm switch that electrically connects another end of the coil and the GND, and a circuit that controls an energization period of the second upper arm switch and the second lower arm switch. The current detection circuit detects current flowing through the coil, and outputs a current detection signal indicating a detection result of the current. The first protection circuit determines whether or not overcurrent has occurred based on the current detection signal, and outputs a first enable signal indicating a determination result to the first drive circuit. The second protection circuit determines whether or not overcurrent has occurred based on the current detection signal, and outputs a second enable signal indicating a determination result to the second drive circuit. A first enable signal line that transmits the first enable signal to the first drive circuit and a second enable signal line that transmits the second enable signal to the second drive circuit are wirings independent of each other.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described in detail below with reference to the drawings.

Figure 1:
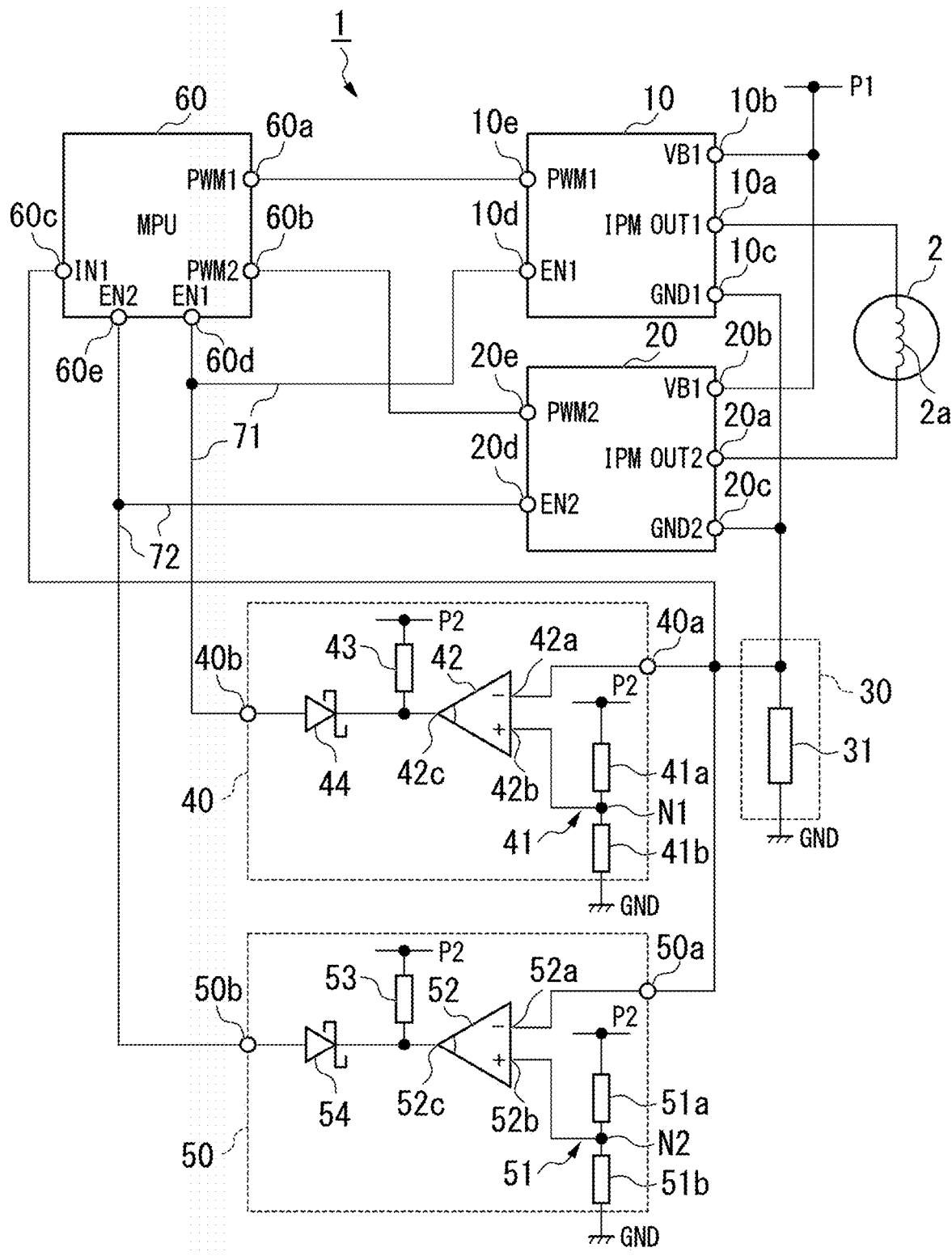
FIG. 1 is a view illustrating a circuit configuration of a motor drive device of an example embodiment of the present disclosure.

FIG. 1 is a view illustrating a circuit configuration of a motor drive device 1 of the present example embodiment. The motor drive device 1 is a device that drives a single-phase direct-current motor 2. The motor drive device 1 includes a first drive circuit 10, a second drive circuit 20, a current detection circuit 30, a first protection circuit 40, a second protection circuit 50, and a controller 60.

The first drive circuit 10 and the second drive circuit 20 are driver ICs such as an intelligent power module (IPM), for example. The first drive circuit 10 includes a first output terminal 10a, a first power source input terminal 10b, a first GND terminal 10c, a first enable signal input terminal 10d, and a first PWM signal input terminal 10e. Similarly, the second drive circuit 20 includes a second output terminal 20a, a second power source input terminal 20b, a second GND terminal 20c, a second enable signal input terminal 20d, and a second PWM signal input terminal 20e.

The first output terminal 10a of the first drive circuit 10 is electrically connected to one end of a coil 2a of the single-phase direct-current motor 2. The second output terminal 20a of the second drive circuit 20 is electrically connected to the other end of the coil 2a. The first power source input terminal 10b of the first drive circuit 10 and the second power source input terminal 20b of the second drive circuit 20 are electrically connected to a power source P1 that supplies a power source voltage necessary for driving the single-phase direct-current motor 2. The first GND terminal 10c of the first drive circuit 10 and the second GND terminal 20c of the second drive circuit 20 are electrically connected to the ground (GND) via the current detection circuit 30.

Although details will be described later, the first drive circuit 10 includes a first upper arm switch 11 that electrically connects one end of the coil 2a of the single-phase direct-current motor 2 and the power source P1, a first lower arm switch 12 that electrically connects one end of the coil 2a and the GND, and a circuit that controls the energization period of the first upper arm switch 11 and the first lower arm switch 12. The second drive circuit 20 includes a second upper arm switch 21 that electrically connects the other end of the coil 2a and the power source P1, a second lower arm switch 22 that electrically connects the other end of the coil 2a and the GND, and a circuit that controls the energization period of the second upper arm switch 21 and the second lower arm switch 22. The magnitude and orientation of the current flowing through the coil 2a of the single-phase direct-current motor 2 are controlled by the cooperative operation of the first drive circuit 10 and the second drive circuit 20. As a result, the rotation speed of the single-phase direct-current motor 2 is controlled.

The current detection circuit 30 is a circuit that detects a current (coil current) flowing through the coil 2a and outputs a current detection signal indicating a detection result of the coil current. The coil current is a current flowing between the power source P1 and the GND via the coil 2a, the first drive circuit 10, and the second drive circuit 20. The current detection circuit 30 includes a shunt resistor 31.

One end of the shunt resistor 31 is electrically connected to the first GND terminal 10c of the first drive circuit 10, the second GND terminal 20c of the second drive circuit 20, an input terminal 40a of the first protection circuit 40, and an input terminal 50a of the second protection circuit 50. The other end of the shunt resistor 31 is electrically connected to GND. A voltage proportional to the coil current flowing through the shunt resistor 31 is generated between the terminals of the shunt resistor 31. Such a voltage between the terminals of the shunt resistor 31 is input as a current detection signal to the input terminal 40a of the first protection circuit 40 and the input terminal 50a of the second protection circuit 50.

The first protection circuit 40 is a circuit that determines whether or not an overcurrent has occurred based on the current detection signal and outputs the first enable signal indicating a determination result to the first drive circuit 10. The first protection circuit 40 includes the input terminal 40a, an output terminal 40b, a first resistance voltage-dividing circuit 41, a first comparator 42, a first pull-up resistor 43, and a first diode 44.

As described above, the input terminal 40a of the first protection circuit 40 is electrically connected to one end of the shunt resistor 31. On the other hand, the output terminal 40b of the first protection circuit 40 is electrically connected to the first enable signal input terminal 10d of the first drive circuit 10 via a first enable signal line 71.

The first resistance voltage-dividing circuit 41 is a circuit that generates a first threshold voltage. The first resistance voltage-dividing circuit 41 includes a first upper resistor 41a and a first lower resistor 41b. The first upper resistor 41a and the first lower resistor 41b are connected in series between a power source P2 that supplies a power source voltage lower than that by the power source P1 and the GND. The voltage generated at an intermediate node N1 between the first upper resistor 41a and the first lower resistor 41b, that is, the voltage between the terminals of the first lower resistor 41b is the first threshold voltage.

The first comparator 42 is a circuit that compares the voltage of the current detection signal with the first threshold voltage and outputs, as the first enable signal, a signal indicating the comparison result. An inverting input terminal 42a of the first comparator 42 is electrically connected to the input terminal 40a of the first protection circuit 40. That is, the current detection signal is input to the inverting input terminal 42a of the first comparator 42. A non-inverting input terminal 42b of the first comparator 42 is electrically connected to the intermediate node N1 of the first resistance voltage-dividing circuit 41. That is, the first threshold voltage is input to the non-inverting input terminal 42b of the first comparator 42. If necessary, a resistance voltage-dividing circuit that divides the voltage of the current detection signal may be provided in a preceding stage of the inverting input terminal 42a.

The first comparator 42 has an open collector type output terminal 42c. The output terminal 42c of the first comparator 42 is electrically connected to the power source P2 via the first pull-up resistor 43. When the voltage of the current detection signal is equal to or lower than the first threshold voltage, the output terminal 42c of the first comparator 42 enters an open state. As a result, the voltage of the output terminal 42c of the first comparator 42 becomes the voltage of the power source P2, that is, a high-level voltage. On the other hand, when the voltage of the current detection signal is higher than the first threshold voltage, the output terminal 42c of the first comparator 42 is electrically connected to the GND. As a result, the voltage of the output terminal 42c of the first comparator 42 becomes a ground-level voltage, that is, a low-level voltage.

In other words, when the voltage of the current detection signal is equal to or lower than the first threshold voltage, that is, when no overcurrent occurs, the first enable signal having the high-level voltage is output from the output terminal 42c of the first comparator 42. On the other hand, when the voltage of the current detection signal is higher than the first threshold voltage, that is, when an overcurrent occurs, the first enable signal having a low-level voltage is output from the output terminal 42c of the first comparator 42.

The output terminal 42c of the first comparator 42 and the output terminal 40b of the first protection circuit 40 are electrically connected via the first diode 44. A cathode terminal of the first diode 44 is electrically connected to the output terminal 42c of the first comparator 42. An anode terminal of the first diode 44 is electrically connected to the output terminal 40b of the first protection circuit 40. That is, the anode terminal of the first diode 44 is electrically connected to the first enable signal input terminal 10d of the first drive circuit 10 via the first enable signal line 71. In the present example embodiment, the first diode 44 is a Schottky barrier diode.

The second protection circuit 50 is a circuit that determines whether or not an overcurrent has occurred based on the current detection signal and outputs the second enable signal indicating a determination result to the second drive circuit 20. The second protection circuit 50 includes the input terminal 50a, an output terminal 50b, a second resistance voltage-dividing circuit 51, a second comparator 52, a second pull-up resistor 53, and a second diode 54.

As described above, the input terminal 50a of the second protection circuit 50 is electrically connected to one end of the shunt resistor 31. On the other hand, the output terminal 50b of the second protection circuit 50 is electrically connected to the second enable signal input terminal 20d of the second drive circuit 20 via a second enable signal line 72.

The second resistance voltage-dividing circuit 51 is a circuit that generates a second threshold voltage. The second resistance voltage-dividing circuit 51 includes a second upper resistor 51a and a second lower resistor 51b. The second upper resistor 51a and the second lower resistor 51b are connected in series between the power source P2 and the GND. The voltage generated at an intermediate node N2 between the second upper resistor 51a and the second lower resistor 51b, that is, the voltage between the terminals of the second lower resistor 51b is the second threshold voltage. In the present example embodiment, the second threshold voltage is equal to the first threshold voltage.

The second comparator 52 is a circuit that compares the voltage of the current detection signal with the second threshold voltage and outputs, as the second enable signal, a signal indicating the comparison result. An inverting input terminal 52a of the second comparator 52 is electrically connected to the input terminal 50a of the second protection circuit 50. That is, the current detection signal is input to the inverting input terminal 52a of the second comparator 52. A non-inverting input terminal 52b of the second comparator 52 is electrically connected to the intermediate node N2 of the second resistance voltage-dividing circuit 51. That is, the second threshold voltage is input to the non-inverting input terminal 52b of the second comparator 52. If necessary, a resistance voltage-dividing circuit that divides the voltage of the current detection signal may be provided in a preceding stage of the inverting input terminal 52a.

The second comparator 52 has an open collector type output terminal 52c. The output terminal 52c of the second comparator 52 is electrically connected to the power source P2 via the second pull-up resistor 53. When the voltage of the current detection signal is equal to or lower than the second threshold voltage, the output terminal 52c of the second comparator 52 enters an open state. As a result, the voltage of the output terminal 52c of the second comparator 52 becomes the voltage of the power source P2, that is, a high-level voltage. On the other hand, when the voltage of the current detection signal is higher than the second threshold voltage, the output terminal 52c of the second comparator 52 is electrically connected to the GND. As a result, the voltage of the output terminal 52c of the second comparator 52 becomes a ground-level voltage, that is, a low-level voltage.

In other words, when the voltage of the current detection signal is equal to or lower than the second threshold voltage, that is, when no overcurrent occurs, the second enable signal having the high-level voltage is output from the output terminal 52c of the second comparator 52. On the other hand, when the voltage of the current detection signal is higher than the second threshold voltage, that is, when an overcurrent occurs, the second enable signal having a low-level voltage is output from the output terminal 52c of the second comparator 52.

The output terminal 52c of the second comparator 52 and the output terminal 50b of the second protection circuit 50 are electrically connected via the second diode 54. A cathode terminal of the second diode 54 is electrically connected to the output terminal 52c of the second comparator 52. An anode terminal of the second diode 54 is electrically connected to the output terminal 50b of the second protection circuit 50. That is, the anode terminal of the second diode 54 is electrically connected to the second enable signal input terminal 20d of the second drive circuit 20 via the second enable signal line 72. In the present example embodiment, the second diode 54 is a Schottky barrier diode.

The controller 60 is a processor IC such as a micro processing unit (MPU), for example. The controller 60 includes a first PWM signal output terminal 60a, a second PWM signal output terminal 60b, a current detection terminal 60c, a first enable signal output terminal 60d, and a second enable signal output terminal 60e.

The controller 60 outputs a first control signal for controlling the first drive circuit 10 to the first drive circuit 10. Specifically, the first PWM signal output terminal 60a of the controller 60 is electrically connected to the first PWM signal input terminal 10e of the first drive circuit 10. The controller 60 outputs a first PWM signal having a predetermined duty ratio as the first control signal from the first PWM signal output terminal 60a to the first PWM signal input terminal 10e.

The controller 60 outputs a second control signal for controlling the second drive circuit 20 to the second drive circuit 20. Specifically, the second PWM signal output terminal 60b of the controller 60 is electrically connected to the second PWM signal input terminal 20e of the second drive circuit 20.

The controller 60 outputs a second PWM signal having a predetermined duty ratio as the second control signal from the second PWM signal output terminal 60b to the second PWM signal input terminal 20e.

The current detection terminal 60c of the controller 60 is electrically connected to one end of the shunt resistor 31. That is, the controller 60 has the current detection terminal 60c to which the current detection signal is input. The first enable signal output terminal 60d of the controller 60 is electrically connected to the first enable signal line 71. The second enable signal output terminal 60e of the controller 60 is electrically connected to the second enable signal line 72.

The first enable signal output terminal 60d and the second enable signal output terminal 60e are both open collector type output terminals. The first enable signal output terminal 60d is electrically connected to the output terminal 40b of the first protection circuit 40 via the first enable signal line 71. The second enable signal output terminal 60e is electrically connected to the output terminal 50b of the second protection circuit 50 via the second enable signal line 72.

Therefore, in the present example embodiment, wired OR connection is made by the first pull-up resistor 43 between the output terminal 42c of the first comparator 42 and the first enable signal output terminal 60d of the controller 60. In the present example embodiment, wired OR connection is made by the second pull-up resistor 53 between the output terminal 52c of the second comparator 52 and the second enable signal output terminal 60e of the controller 60.

The controller 60 determines whether or not an overcurrent has occurred based on the current detection signal input via the current detection terminal 60c according to a predetermined program, and controls the state of the first enable signal output terminal 60d and the state of the second enable signal output terminal 60e according to the determination result.

Specifically, when the voltage of the current detection signal is equal to or lower than a third threshold voltage, the controller 60 controls the first enable signal output terminal 60d and the second enable signal output terminal 60e to the high-level voltage. On the other hand, when the voltage of the current detection signal is higher than the third threshold voltage, the controller 60 electrically connects the first enable signal output terminal 60d and the second enable signal output terminal 60e to the GND. The third threshold voltage is set to a value equal to the first threshold voltage and the second threshold voltage.

When the output terminal 42c of the first comparator 42 enters the open state and the first enable signal output terminal 60d of the controller 60 becomes at the high-level voltage, the voltage of the first enable signal line 71 becomes at the high-level voltage. In this case, the first enable signal having a high-level voltage is input to the first enable signal input terminal 10d of the first drive circuit 10. In other words, when it is determined that no overcurrent has occurred in both the first protection circuit 40 and the controller 60, the first enable signal having the high-level voltage is input to the first enable signal input terminal 10d of the first drive circuit 10.

When at least one of the output terminal 42c of the first comparator 42 and the first enable signal output terminal 60d of the controller 60 is connected to the GND, the voltage of the first enable signal line 71 becomes a low-level voltage. In this case, the first enable signal having a low-level voltage is input to the first enable signal input terminal 10d of the first drive circuit 10. In other words, when it is determined that an overcurrent has occurred in at least one of the first protection circuit 40 and the controller 60, the first enable signal having the low-level voltage is input to the first enable signal input terminal 10d of the first drive circuit 10.

When the output terminal 52c of the second comparator 52 enters the open state and the second enable signal output terminal 60e of the controller 60 becomes at the high-level voltage, the voltage of the second enable signal line 72 becomes at the high-level voltage. In this case, the second enable signal having a high-level voltage is input to the second enable signal input terminal 20d of the second drive circuit 20. In other words, when it is determined that no overcurrent has occurred in both the second protection circuit 50 and the controller 60, the second enable signal having the high-level voltage is input to the second enable signal input terminal 20d of the second drive circuit 20.

When at least one of the output terminal 52c of the second comparator 52 and the second enable signal output terminal 60e of the controller 60 is connected to the GND, the voltage of the second enable signal line 72 becomes a low-level voltage. In this case, the second enable signal having a low-level voltage is input to the second enable signal input terminal 20d of the second drive circuit 20. In other words, when it is determined that an overcurrent has occurred in at least one of the second protection circuit 50 and the controller 60, the second enable signal having the low-level voltage is input to the second enable signal input terminal 20d of the second drive circuit 20.

In the present example embodiment, the first enable signal line 71 that transmits the first enable signal to the first drive circuit 10 and the second enable signal line 72 that transmits the second enable signal to the second drive circuit 20 are wirings independent of each other. The "wirings independent of each other" means a pair of electrically separated wirings. More specifically, the resistance value between the first enable signal line 71 and the second enable signal line 72 provided on a circuit board is measured in a state where no electronic component is mounted on the circuit board. At this time, when a resistance value of equal to or greater than 10 MΩ is measured, the first enable signal line 71 and the second enable signal line 72 are the pair of electrically separated wirings.

Next, the internal configurations of the first drive circuit 10 and the second drive circuit 20 will be described in detail with reference to FIG. 2.

Figure 2:
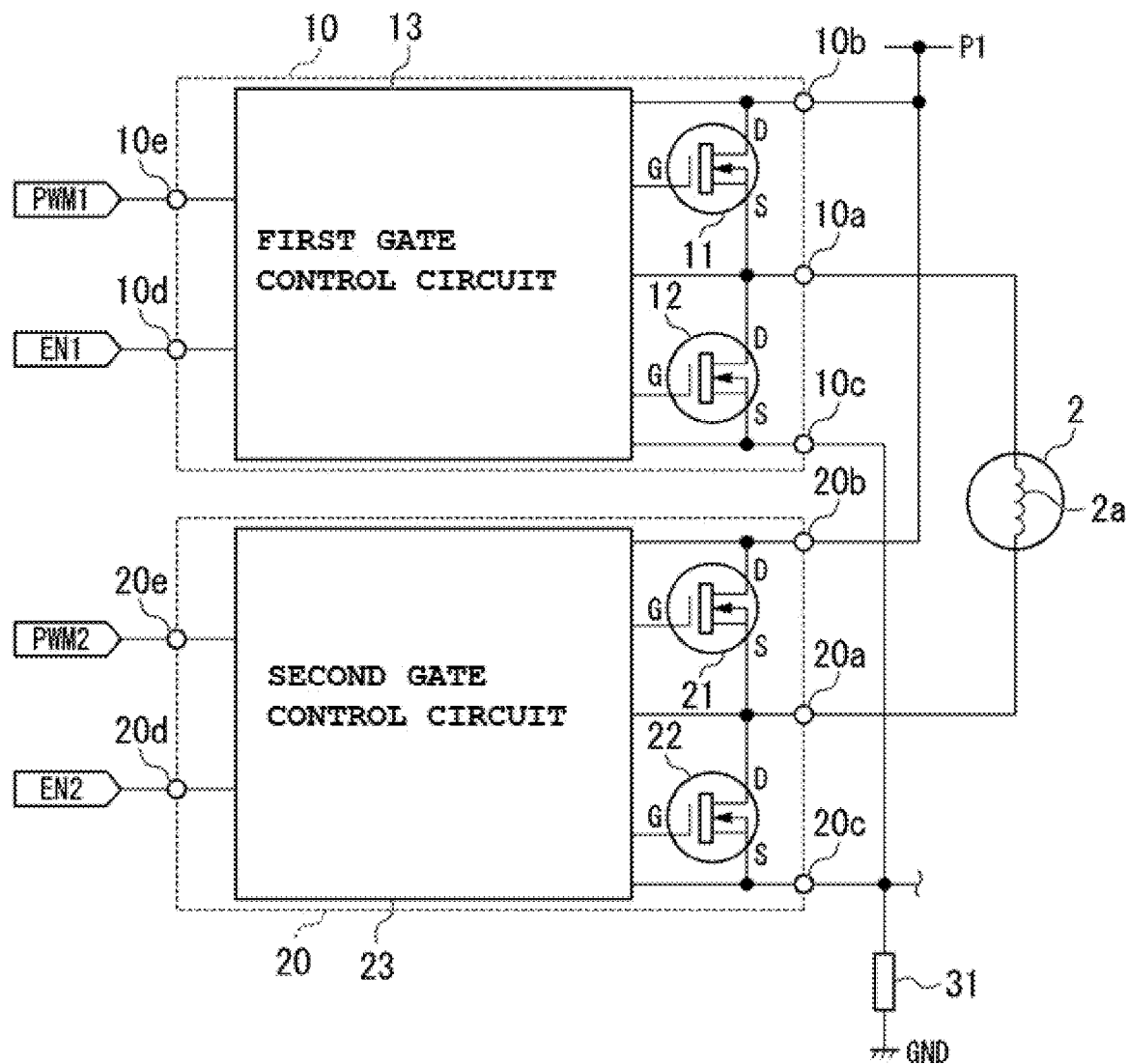
FIG. 2 is a view illustrating internal configurations of a first drive circuit and a second drive circuit of an example embodiment of the present disclosure.

As illustrated in FIG. 2, the first drive circuit 10 includes the first upper arm switch 11, the first lower arm switch 12, and a first gate control circuit 13. The first gate control circuit 13 is a circuit that controls the energization period of the first upper arm switch 11 and the first lower arm switch 12.

In the present example embodiment, the first upper arm switch 11 is an N-channel MOS-FET. The first upper arm switch 11 is connected between the first power source input terminal 10b and the first output terminal 10a. A drain terminal of the first upper arm switch 11 is electrically connected to the first power source input terminal 10b. A source terminal of the first upper arm switch 11 is electrically connected to the first output terminal 10a and the first gate control circuit 13. A gate terminal of the first upper arm switch 11 is electrically connected to the first gate control circuit 13. The first upper arm switch 11 may be a P-channel MOS-FET or a transistor.

In the present example embodiment, the first lower arm switch 12 is an N-channel MOS-FET. The first lower arm switch 12 is connected between the first output terminal 10a and the first GND terminal 10c. A drain terminal of the first lower arm switch 12 is electrically connected to the first output terminal 10a. A source terminal of the first lower arm switch 12 is electrically connected to the first GND terminal 10c and the first gate control circuit 13. A gate terminal of the first lower arm switch 12 is electrically connected to the first gate control circuit 13. Note that the first lower arm switch 12 may be a MOS-FET or a transistor.

The first gate control circuit 13 is electrically connected to the first enable signal input terminal 10d and electrically connected to the first PWM signal input terminal 10e. That is, the first enable signal and the first PWM signal are input to the first gate control circuit 13. Based on the first enable signal and the first PWM signal, the first gate control circuit 13 controls a first upper arm gate voltage that is a gate-source voltage of the first upper arm switch 11 and a first lower arm gate voltage that is a gate-source voltage of the first lower arm switch 12.

Specifically, when the first enable signal is at a high level and the first PWM signal is at a high level, the first gate control circuit 13 controls the first upper arm gate voltage to a high level and controls the first lower arm gate voltage to a low level. In this case, the first upper arm switch 11 is turned on, and the first lower arm switch 12 is turned off. When the first enable signal is at a high level and the first PWM signal is at a low level, the first gate control circuit 13 controls the first upper arm gate voltage to a low level and controls the first lower arm gate voltage to a high level. In this case, the first upper arm switch 11 is turned off, and the first lower arm switch 12 is turned on. On the other hand, when the first enable signal is at the low level, the first gate control circuit 13 forcibly controls both the first upper arm gate voltage and the first lower arm gate voltage to the low level regardless of the level of the first PWM signal. In this case, the first upper arm switch 11 and the first lower arm switch 12 are forcibly turned off.

As illustrated in FIG. 2, the second drive circuit 20 includes the second upper arm switch 21, the second lower arm switch 22, and a second gate control circuit 23. The second gate control circuit 23 is a circuit that controls the energization period of the second upper arm switch 21 and the second lower arm switch 22.

In the present example embodiment, the second upper arm switch 21 is an N-channel MOS-FET. The second upper arm switch 21 is connected between the second power source input terminal 20*b* and the second output terminal 20*a*. A drain terminal of the second upper arm switch 21 is electrically connected to the second power source input terminal 20*b*. A source terminal of the second upper arm switch 21 is electrically connected to the second output terminal 20*a* and the second gate control circuit 23. A gate terminal of the second upper arm switch 21 is electrically connected to the second gate control circuit 23. The second upper arm switch 21 may be a P-channel MOS-FET or a transistor.

In the present example embodiment, the second lower arm switch 22 is an N-channel MOS-FET. The second lower arm switch 22 is connected between the second output terminal 20*a* and the second GND terminal 20*c*. A drain terminal of the second lower arm switch 22 is electrically connected to the second output terminal 20*a*. A source terminal of the second lower arm switch 22 is electrically connected to the second GND terminal 20*c* and the second gate control circuit 23. A gate terminal of the second lower arm switch 22 is electrically connected to the second gate control circuit 23. Note that the second lower arm switch 22 may be a MOS-FET or a transistor.

The second gate control circuit 23 is electrically connected to the second enable signal input terminal 20*d* and electrically connected to the second PWM signal input terminal 20*e*. That is, the second enable signal and the second PWM signal are input to the second gate control circuit 23. Based on the second enable signal and the second PWM signal, the second gate control circuit 23 controls a second upper arm gate voltage that is a gate-source voltage of the second upper arm switch 21 and a second lower arm gate voltage that is a gate-source voltage of the second lower arm switch 22.

Specifically, when the second enable signal is at a high level and the second PWM signal is at a high level, the second gate control circuit 23 controls the second upper arm gate voltage to a high level and controls the second lower arm gate voltage to a low level. In this case, the second upper arm switch 21 is turned on, and the second lower arm switch 22 is turned off. When the second enable signal is at a high level and the second PWM signal is at a low level, the second gate control circuit 23 controls the second upper arm gate voltage to a low level and controls the second lower arm gate voltage to a high level. In this case, the second upper arm switch 21 is turned off, and the second lower arm switch 22 is turned on. On the other hand, when the second enable signal is at the low level, the second gate control circuit 23 forcibly controls both the second upper arm gate voltage and the second lower arm gate voltage to the low level regardless of the level of the second PWM signal. In this case, the second upper arm switch 21 and the second lower arm switch 22 are forcibly turned off.

As described above, the first drive circuit 10 and the second drive circuit 20 constitute an H-bridge circuit. Hereinafter, the operation of the H-bridge circuit constituted by the first drive circuit 10 and the second drive circuit 20 will be described.

First, the operation of the H-bridge circuit when no overcurrent has occurred will be described.

When no overcurrent has occurred, the voltage of the current detection signal output from the current detection circuit 30 is lower than the first threshold voltage, the second threshold voltage, and the third threshold voltage. Therefore, it is determined that no overcurrent has occurred in both the first protection circuit 40 and the controller 60, and as a result, the first enable signal having a high-level voltage is input to the first enable signal input terminal 10*d* of the first drive circuit 10. Similarly, it is determined that no overcurrent has occurred in both the second protection circuit 50 and the controller 60, and as a result, the second enable signal having a high-level voltage is input to the second enable signal input terminal 20*d* of the second drive circuit 20. The single-phase direct-current motor 2 rotates by alternately repeating the forward rotation mode and the reverse rotation mode described below.

In the period of the forward rotation mode, the first PWM signal having a duty ratio set according to a target rotation speed is input to the first PWM signal input terminal 10*e* of the first drive circuit 10, and the low-level second PWM signal is input to the second PWM signal input terminal 20*e* of the second drive circuit 20. As a result, in the period of the forward rotation mode, the first upper arm switch 11 and the first lower arm switch 12 are PWM-driven by the first PWM signal. On the other hand, in the period of the forward rotation mode, the second upper arm switch 21 is turned off, and the second lower arm switch 22 is turned on.

For example, when the actual rotation speed of the single-phase direct-current motor 2 approaches the target rotation speed from a low rotation speed, the controller 60 increases a change rate of high-level time of the first PWM signal if the deviation of the actual rotation speed with respect to the target rotation speed is large, and decreases the change rate of the high-level time of the first PWM signal if the deviation is small. When the actual rotation speed reaches the target rotation speed, the controller 60 maintains the high-level time of the first PWM signal substantially constant.

On the other hand, when the actual rotation speed of the single-phase direct-current motor 2 approaches the target rotation speed from a high rotation speed, the controller 60 sets the high-level time of the first PWM signal to zero or a minimum value until the actual rotational speed reaches the target rotational speed, and, when the actual rotational speed reaches the target rotational speed, maintains the high-level time of the first PWM signal substantially constant. When the actual rotational speed falls below the target rotational speed, the controller 60 transitions to the control in a case where the actual rotational speed approaches the target rotational speed from a lower rotational speed described above.

Figure 3:
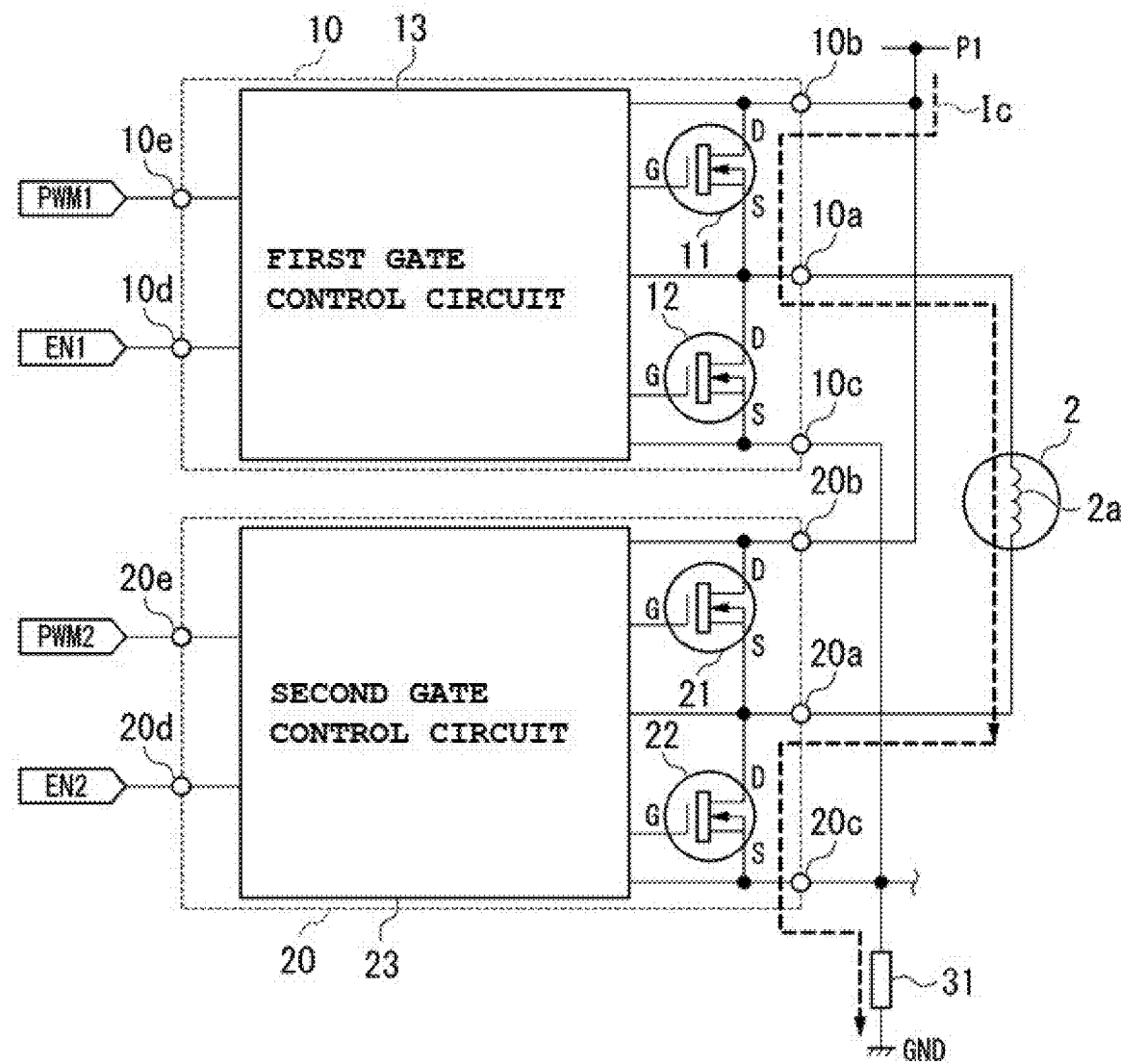
FIG. 3 is a view illustrating an orientation of a coil current flowing through a coil of a single-phase direct-current motor in a forward rotation mode according to an example embodiment of the present disclosure.

As illustrated in FIG. 3, in the period of the forward rotation mode, a coil current Ic flows through the power source P1, the first upper arm switch 11, the coil 2a, the second lower arm switch 22, the current detection circuit 30 (shunt resistor 31), and the GND in this order. In the period of the forward rotation mode, the first upper arm switch 11 and the first lower arm switch 12 are PWM-driven as described above, whereby the current value of the coil current Ic becomes a current value necessary for rotating the single-phase direct-current motor 2 at the target rotation speed.

In the period of the reverse rotation mode, the second PWM signal having a duty ratio set according to the target rotation speed is input to the second PWM signal input terminal 20e of the second drive circuit 20, and the low-level first PWM signal is input to the first PWM signal input terminal 10e of the first drive circuit 10. As a result, in the period of the reverse rotation mode, the second upper arm switch 21 and the second lower arm switch 22 are PWM-driven by the second PWM signal. On the other hand, in the period of the reverse rotation mode, the first upper arm switch 11 is turned off, and the first lower arm switch 12 is turned on.

For example, when the actual rotation speed of the single-phase direct-current motor 2 approaches the target rotation speed from a low rotation speed, the controller 60 increases a change rate of high-level time of the second PWM signal if the deviation of the actual rotation speed with respect to the target rotation speed is large, and decreases the change rate of the high-level time of the second PWM signal if the deviation is small. When the actual rotation speed reaches the target rotation speed, the controller 60 maintains the high-level time of the second PWM signal substantially constant.

On the other hand, when the actual rotation speed of the single-phase direct-current motor 2 approaches the target rotation speed from a high rotation speed, the controller 60 sets the high-level time of the second PWM signal to zero or a minimum value until the actual rotational speed reaches the target rotational speed, and, when the actual rotational speed reaches the target rotational speed, maintains the high-level time of the second PWM signal substantially constant. When the actual rotational speed falls below the target rotational speed, the controller 60 transitions to the control in a case where the actual rotational speed approaches the target rotational speed from a lower rotational speed described above.

Figure 4:
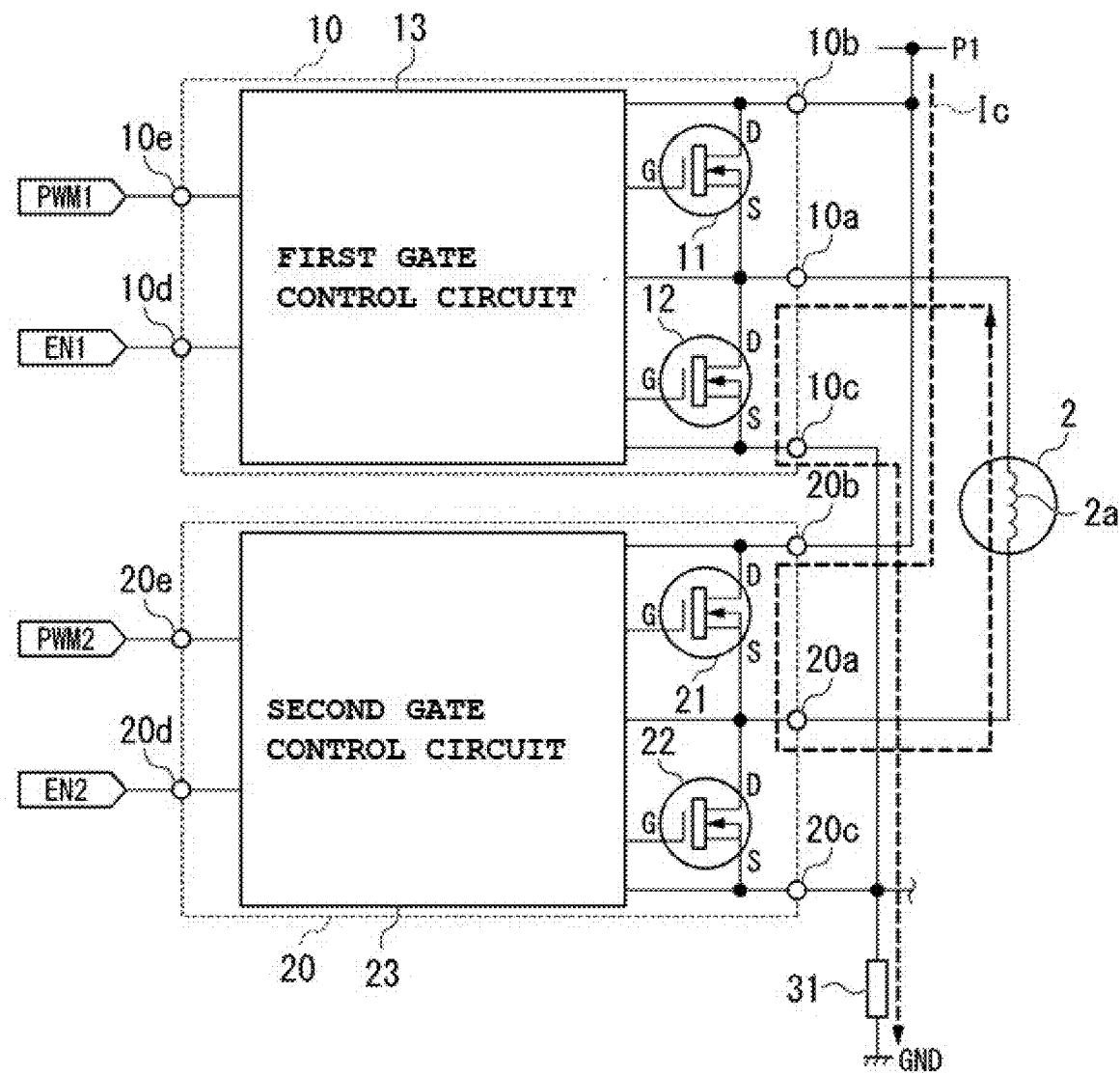
FIG. 4 is a view illustrating an orientation of a coil current flowing through a coil of a single-phase direct-current motor in a reverse rotation mode according to an example embodiment of the present disclosure.

As illustrated in FIG. 4, in the period of the reverse rotation mode, the coil current Ic flows through the power source P1, the second upper arm switch 21, the coil 2a, the first lower arm switch 12, the current detection circuit 30 (shunt resistor 31), and the GND in this order. In the period of the reverse rotation mode, the second upper arm switch 21 and the second lower arm switch 22 are PWM-driven as described above, whereby the current value of the coil current Ic becomes a current value necessary for rotating the single-phase direct-current motor 2 at the target rotation speed.

By alternately repeating the forward rotation mode and the reverse rotation mode as above, the single-phase direct-current motor 2 rotates at the target rotation speed.

Next, the operation of the H-bridge circuit when an overcurrent has occurred will be described.

When an overcurrent has occurred, the voltage of the current detection signal output from the current detection circuit 30 becomes higher than the first threshold voltage, the second threshold voltage, and the third threshold voltage. Therefore, it is determined that an overcurrent has occurred in at least one of the first protection circuit 40 and the controller 60, and as a result, the first enable signal having a low-level voltage is input to the first enable signal input terminal 10d of the first drive circuit 10. Therefore, it is determined that an overcurrent has occurred in at least one of the second protection circuit 50 and the controller 60, and as a result, the second enable signal having a low-level voltage is input to the second enable signal input terminal 20d of the second drive circuit 20.

When a high-active first enable signal becomes a low level, both the first upper arm switch 11 and the first lower arm switch 12 are forcibly turned off regardless of the first PWM signal. Similarly, when a high-active second enable signal becomes the low level, both the second upper arm switch 21 and the second lower arm switch 22 are forcibly turned off regardless of the second PWM signal.

Figure 5:
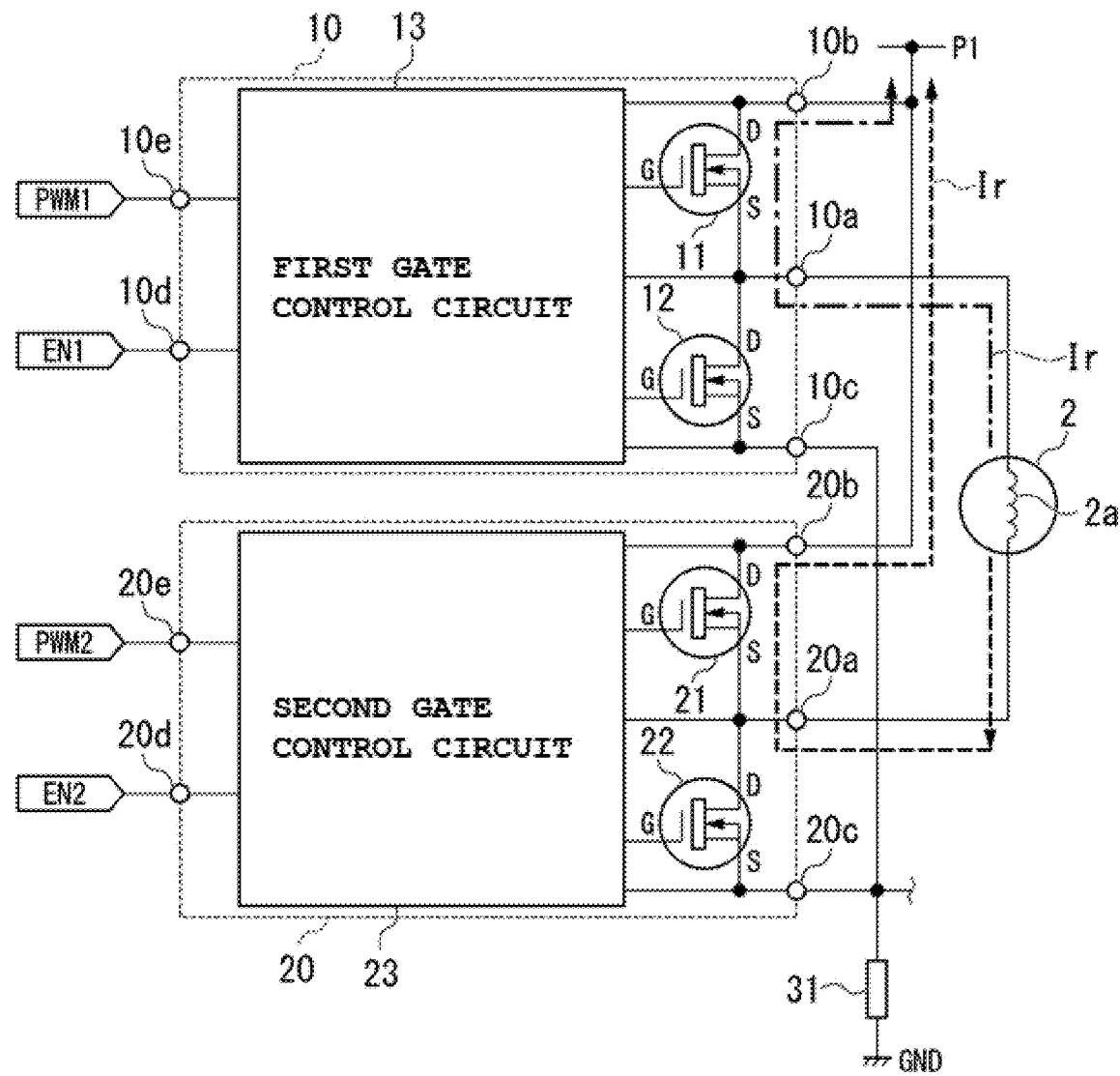
FIG. 5 is a view illustrating a state in which regenerative brake by a regenerative current is applied to the single-phase direct-current motor when an overcurrent occurs.

As described above, when an overcurrent occurs, all the arm switches are forcibly turned off. As a result, the coil current does not flow through the coil 2a. As illustrated in FIG. 5, when the coil current does not flow, the single-phase direct-current motor 2 operates as a generator, and a regenerative current Ir flows through an illustrated path via body diodes of the first upper arm switch 11 and the second upper arm switch 21, which are N-channel MOS-FETs. By being applied with the regenerative brake by the regenerative current Ir, the rotation of the single-phase direct-current motor 2 is stopped.

As described above, when an overcurrent occurs, the rotation of the single-phase direct-current motor 2 can be forcibly stopped.

It is assumed, for example, a case where the voltage of the first enable signal input terminal 10d is fixed to a high level due to an internal failure of the first drive circuit 10, that is, a case where the voltage of the first enable signal line 71 is fixed to a high-level voltage. In this case, even if an overcurrent occurs, the first drive circuit 10 repeats the operation of the forward rotation mode and the reverse rotation mode as usual. On the other hand, in the present example embodiment, since the first enable signal line 71 and the second enable signal line 72 are the wirings independent of each other, the second enable signal line 72 is not electrically affected by the first enable signal line 71. Therefore, even if an overcurrent occurs in a state where the voltage of the first enable signal line 71 is fixed to the high-level voltage, the second enable signal having the low-level voltage is normally input to the second enable signal input terminal 20d of the second drive circuit 20. As a result, the second drive circuit 20 is forcibly turned off regardless of the first drive circuit 10, and the single-phase direct-current motor 2 is stopped.

As described above, even in a case where the voltage of the first enable signal line 71 is fixed to the high-level voltage due to an internal failure or the like of the first drive circuit 10, for example, a normal low-level second enable signal can be transmitted to the second drive circuit 20 when an overcurrent occurs. Similarly, even in a case where the voltage of the second enable signal line 72 is fixed to the high-level voltage due to an internal failure or the like of the second drive circuit 20, a normal low-level first enable signal can be transmitted to the first drive circuit 10 when an overcurrent occurs. Therefore, redundancy of the protection function required by the VDE standard is obtained.

As described above, the motor drive device 1 of the present example embodiment includes the first drive circuit 10, the second drive circuit 20, the current detection circuit 30, the first protection circuit 40, and the second protection circuit 50. The first drive circuit 10 includes the first upper arm switch 11 that electrically connects one end of the coil 2a of the single-phase direct-current motor 2 and the power source P1, the first lower arm switch 12 that electrically connects one end of the coil 2a and the GND, and the circuit that controls the energization period of the first upper arm switch 11 and the first lower arm switch 12. The second drive circuit 20 includes a second upper arm switch 21 that electrically connects the other end of the coil 2a and the power source P1, a second lower arm switch 22 that electrically connects the other end of the coil 2a and the GND, and a circuit that controls the energization period of the second upper arm switch 21 and the second lower arm switch 22. The current detection circuit 30 detects the coil current flowing through the coil 2a, and outputs the current detection signal indicating the detection result of the coil current. The first protection circuit 40 determines whether or not an overcurrent has occurred based on the current detection signal, and outputs the first enable signal indicating the determination result to the first drive circuit 10. The second protection circuit 20 determines whether or not an overcurrent has occurred based on the current detection signal, and outputs the second enable signal indicating the determination result to the second drive circuit 20.

In the motor drive device 1 described above, the first enable signal line 71 that transmits the first enable signal to the first drive circuit 10 and the second enable signal line 72 that transmits the second enable signal to the second drive circuit 20 are wirings independent of each other.

In the VDE standard, it is required to duplicate (make redundant) the protection function of a motor, but if this request is handled by software-based processing using a microcomputer or the like, it is necessary to perform software program evaluation with high cost and a long evaluation period. On the other hand, in the present example embodiment, since the two protection circuits that are hardware cope with the requirement of the VDE standard, software program evaluation becomes unnecessary. As a result, it is possible to evaluate, at low cost, whether or not the VDE standard is satisfied, and it is also possible to shorten the evaluation period.

by making the first enable signal line 71 and the second enable signal line 72 independent wirings, even in a case where the voltage of the first enable signal line 71 is fixed to a high level (active potential) due to an internal failure of the first drive circuit 10, for example, it is possible to avoid an influence on the second enable signal line 72. As a result, a normal low-level second enable signal can be transmitted to the second drive circuit 10 when an overcurrent occurs, and redundancy of the protection function required by the VDE standard is obtained.

Therefore, according to the present example embodiment, it is possible to provide the motor drive device 1 capable of satisfying the following two requirements.

(1) It is possible to evaluate, at low cost and in a short period of time, whether the VDE standard is satisfied.

(2) It is possible to avoid loss of redundancy of the protection function required by the VDE standard.

The motor drive device 1 of the present example embodiment further includes the controller 60 that outputs the first PWM signal for controlling the first drive circuit 10 to the first drive circuit 10 and outputs the second PWM signal for controlling the second drive circuit 20 to the second drive circuit 20. The controller 60 includes the first enable signal output terminal 60d electrically connected to the first enable signal line 71 and the second enable signal output terminal 60e electrically connected to the second enable signal line 72.

Due to this, in addition to the two protection circuits, the controller 60 can also output the first enable signal to the first drive circuit 10 and output the second enable signal to the second drive circuit 20. As a result, it is possible to further enhance the redundancy of the protection function required by the VDE standard.

In the motor drive device 1 of the present example embodiment, the controller 60 has the current detection terminal 60c to which the current detection signal is input.

By inputting a current detection signal to the controller 60, it is determined whether or not an overcurrent has occurred by software-based processing by the controller 60, and the first enable signal and the second enable signal that indicate the determination result can be output from the controller 60 to the first drive circuit 10 and the second drive circuit 20. As a result, it is possible to further enhance the redundancy of the protection function in a case where an overcurrent occurs in particular.

In the present example embodiment, the first protection circuit 40 includes the first resistance voltage-dividing circuit 41 that generates the first threshold voltage, and the first comparator 42 that compares the voltage of the current detection signal with the first threshold voltage and outputs, as the first enable signal, a signal indicating the comparison result. The second protection circuit 50 includes the second resistance voltage-dividing circuit 51 that generates the second threshold voltage, and the second comparator 52 that compares the voltage of the current detection signal with the second threshold voltage and outputs, as the second enable signal, a signal indicating the comparison result. Wired OR connection is made between the output terminal 42c of the first comparator 42 and the first enable signal output terminal 60d of the controller 60. Wired OR connection is made between the output terminal 52c of the second comparator 52 and the second enable signal output terminal 60e of the controller 60.

This allows a simple circuit configuration to bring at least one of the two drive circuits into a stopped state in a case where a low-level (inactive potential) enable signal is output from at least one of the protection circuit and the controller.

In the present example embodiment, the first protection circuit 40 further includes the first diode 44 connected between the output terminal 42c of the first comparator 42 and the first enable signal output terminal 60d of the controller 60. The second protection circuit 50 further includes the second diode 54 connected between the output terminal 52c of the second comparator 52 and the second enable signal output terminal 60e of the controller 60. The anode terminal of the first diode 44 is connected to the first enable signal output terminal 60d, and the cathode terminal of the first diode 44 is connected to the output terminal 42c of the first comparator 42. The anode terminal of the second diode 54 is connected to the second enable signal output terminal 60e, and the cathode terminal of the second diode 54 is connected to the output terminal 52c of the second comparator 52.

By providing the first diode 44 in this manner, it is possible to electrically disconnect the first protection circuit 40 from a circuit connected at a subsequent stage thereof in a normal state where no overcurrent has occurred. This makes it possible to prevent noise generated from an analog component constituting the first protection circuit 40 from propagating to a subsequent stage circuit of the first protection circuit 40. In an abnormal state where an overcurrent has occurred, a low-level enable signal output from the protection circuit (comparator) is preferentially transmitted to the drive circuit rather than an enable signal output from the controller.

Note that the first diode 44 and the second diode 54 are required not to be necessarily provided, but in that case, an effect of preventing noise from propagating to a subsequent stage circuit of the first protection circuit 40 is not obtained.

In the present example embodiment, the first diode 44 and the second diode 54 are each a Schottky barrier diode.

By using the Schottky barrier diodes as the first diode 44 and the second diode 54, when the open collector type output terminal of the comparator is connected to the GND, the voltage of the enable signal (output voltage of the comparator) can be dropped to a value close to the ground level, and the drive circuit can be reliably switched to the stopped state.

The present disclosure is not limited to the above example embodiment, and the configurations described in the present description can be appropriately combined within a range not conflicting with one another.

For example, in the above example embodiment, the case where the first drive circuit 10 and the second drive circuit 20 are implemented by separate driver ICs has been described. On the other hand, the first drive circuit 10 and the second drive circuit 20 may be implemented by one driver IC.

In the above example embodiment, the controller 60 determines whether or not an overcurrent has occurred based on the current detection signal input via the current detection terminal 60*c* according to a predetermined program, and controls the state of the first enable signal output terminal 60*d* and the state of the second enable signal output terminal 60*e* according to the determination result. For example, an output signal of a temperature sensor capable of detecting the temperature of the single-phase direct-current motor 2 may be input to the controller 60. In this case, the controller 60 determines whether or not excessive temperature rise has occurred based on the output signal of the temperature sensor according to a predetermined program, and controls the state of the first enable signal output terminal 60*d* and the state of the second enable signal output terminal 60*e* in response to the determination result.

In the above example embodiment, the case where the Schottky barrier diodes are used as the first diode 44 and the second diode 54 has been described, but other diodes may be used as the first diode 44 and the second diode 54.

Features of the above-described preferred embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor drive device that drives a single-phase direct-current motor, the motor drive device comprising:
    a first drive circuit that includes a first upper arm switch that electrically connects one end of a coil of the single-phase direct-current motor and a power source, a first lower arm switch that electrically connects the one end of the coil and GND, and a circuit to control an energization period of the first upper arm switch and the first lower arm switch;
    a second drive circuit that includes a second upper arm switch that electrically connects another end of the coil and the power source, a second lower arm switch that electrically connects the other end of the coil and the GND, and a circuit to control an energization period of the second upper arm switch and the second lower arm switch;
    a current detection circuit to detect current flowing through the coil, and output a current detection signal indicating a detection result of the current;
    a first protection circuit to determine whether or not overcurrent has occurred based on the current detection signal, and output a first enable signal indicating a determination result to the first drive circuit; and
    a second protection circuit to determine whether or not overcurrent has occurred based on the current detection signal, and output a second enable signal indicating a determination result to the second drive circuit; wherein
    a first enable signal line to transmit the first enable signal to the first drive circuit and a second enable signal line to transmit the second enable signal to the second drive circuit are wirings independent of each other.

2. The motor drive device according to claim 1 further comprising:
    a controller to output a first control signal to control the first drive circuit to the first drive circuit and output a second control signal to control the second drive circuit to the second drive circuit; wherein
    the controller includes:
        a first enable signal output terminal electrically connected to the first enable signal line; and
        a second enable signal output terminal electrically connected to the second enable signal line.

3. The motor drive device according to claim 2, wherein the controller includes a current detection terminal to which the current detection signal is input.

4. The motor drive device according to claim 2, wherein the first protection circuit includes:
    a first resistance voltage-dividing circuit to generate a first threshold voltage; and
    a first comparator to compare voltage of the current detection signal with the first threshold voltage and output a signal indicating a comparison result as the first enable signal;
the second protection circuit includes:
    a second resistance voltage-dividing circuit to generate a second threshold voltage; and
    a second comparator to compare voltage of the current detection signal with the second threshold voltage and output a signal indicating a comparison result as the second enable signal;
a wired OR connection is between an output terminal of the first comparator and the first enable signal output terminal of the controller; and
another wired OR connection is between an output terminal of the second comparator and the second enable signal output terminal of the controller.

5. The motor drive device according to claim 4, wherein the first protection circuit further includes a first diode connected between an output terminal of the first comparator and the first enable signal output terminal of the controller;
the second protection circuit further includes a second diode connected between an output terminal of the second comparator and the second enable signal output terminal of the controller;
an anode terminal of the first diode is connected to the first enable signal output terminal;

a cathode terminal of the first diode is connected to an output terminal of the first comparator;

an anode terminal of the second diode is connected to the second enable signal output terminal; and a cathode terminal of the second diode is connected to an output terminal of the second comparator.

6. The motor drive device according to claim 5, wherein each of the first diode and the second diode is a Schottky barrier diode.

\* \* \* \* \*